(12) United States Patent
Mizuno et al.

(10) Patent No.: US 6,522,521 B2
(45) Date of Patent: Feb. 18, 2003

(54) REDUCTION-RESISTANT DIELECTRIC CERAMIC COMPACT AND LAMINATED CERAMIC CAPACITOR

(75) Inventors: Shinobu Mizuno, Omihachiman (JP); Hisashi Miki, Kyoto (JP); Harunobu Sano, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 09/919,409

(22) Filed: Jul. 31, 2001

(65) Prior Publication Data

US 2002/0039272 A1 Apr. 4, 2002

(30) Foreign Application Priority Data

Jul. 31, 2000 (JP) .......................................... 2000-231084

(51) Int. Cl.[7] .................................................. H01G 4/06
(52) U.S. Cl. ................................. 361/321.4; 361/321.2; 361/306.3; 361/311; 361/313; 501/137; 501/138; 501/139
(58) Field of Search ............................. 361/321.4, 320, 361/321.1, 321.2, 321.3, 321.5, 311, 313, 306.3, 321, 309; 501/137, 138, 139

(56) References Cited

U.S. PATENT DOCUMENTS

| | | | |
|---|---|---|---|
| 4,283,753 A | * | 8/1981 | Burn |
| 4,451,869 A | * | 5/1984 | Sakabe et al. |
| 5,815,368 A | * | 9/1998 | Sakamoto et al. |
| 5,822,176 A | * | 10/1998 | Sano et al. |
| 6,205,015 B1 | * | 3/2001 | Wada et al. |
| 6,320,738 B1 | * | 11/2001 | Yamana et al. |
| 6,356,037 B1 | * | 3/2002 | Sano et al. |

FOREIGN PATENT DOCUMENTS

| | | |
|---|---|---|
| JP | 61-014611 | 1/1986 |
| JP | 04-264307 | 9/1992 |
| JP | 05-109319 | 4/1993 |
| JP | 06-005460 | 1/1994 |
| JP | 07-201645 | 8/1995 |
| JP | 07-272971 | 10/1995 |
| JP | 08-124785 | 5/1996 |
| JP | 08-151260 | 6/1996 |
| JP | 2000-327414 | 11/2000 |

* cited by examiner

Primary Examiner—Dean A. Reichard
Assistant Examiner—Nguyen T Ha
(74) Attorney, Agent, or Firm—Dickstein, Shapiro, Morin & Oshinsky, LLP (57) ABSTRACT

A dielectric ceramic compact is provided which can decrease loss and heat generation under high frequency and high voltage or large current conditions, which exhibits a stable insulating resistance by AC or DC loading, and which can form a laminated ceramic capacitor using nickel or the like as an internal electrode material. The reduction-resistant dielectric ceramic compact is formed of an auxiliary sintering agent and a solid solution containing barium titanate as a primary component represented by the formula $ABO_3 + aR + bM$, where R is a compound containing an element such as La, and M is a compound containing an element such as Mn. In addition, $1.000 < A/B \leq 1.035$, $0.005 \leq a \leq 0.12$, and $0.005 \leq b \leq 0.12$. Furthermore, in the ceramic, the crystalline axis ratio c/a obtained by x-ray diffraction in a temperature range of $-25°$ C. or above satisfies $1.000 \leq c/a \leq 1.003$, and in temperature dependence of relative dielectric constant measured at an electric field of 2 Vrms/mm or less and at a frequency of 1 kHz, the maximum peak is present at a temperature of below $-25°$ C.

21 Claims, 1 Drawing Sheet

REDUCTION-RESISTANT DIELECTRIC CERAMIC COMPACT AND LAMINATED CERAMIC CAPACITOR

BACKGROUND OF THE INVENTION

1. Field of the Invention

The present invention relates to reduction-resistant dielectric ceramic compacts and laminated ceramic capacitors comprising dielectric ceramic layers formed of the reduction-resistant dielectric ceramic compacts, and more particularly, relates to a laminated ceramic capacitor which is advantageously used in a high-frequency AC region or in an intermediate to high DC voltage range and which comprises internal electrodes formed of a base metal, and to a reduction-resistant dielectric ceramic compact for forming dielectric ceramic layers for use in the laminated ceramic capacitor.

2. Description of the Related Art

Heretofore, laminated ceramic capacitors are generally manufactured in a manner as described below.

First, ceramic green sheets, which contain a dielectric material and are coated with an electrode material for forming internal electrodes, are prepared for forming dielectric ceramic layers. As the dielectric material, a material primarily composed of, for example, $BaTiO_3$ is used. Next, the ceramic green sheets coated with this electrode material are laminated to each other and are then bonded together by thermo-compression bonding, and the laminate thus formed is fired, thereby yielding a ceramic laminate having the internal electrodes. Subsequently, external electrodes, which are electrically connected to the internal electrodes, are provided on end surfaces of this ceramic laminate by firing, whereby a laminated ceramic capacitor is obtained.

Consequently, a material which is not oxidized during firing of a ceramic laminate has been generally selected as the material used for the internal electrodes. For example, noble metals, such as platinum, gold, palladium and a silver-palladium alloy, have been used as the materials for the internal electrodes. However, even though these internal electrode materials have superior characteristics, since they are significantly expensive, these materials are most responsible for an increase in manufacturing cost of the laminated ceramic capacitors.

Accordingly, a laminated ceramic capacitor has been proposed which uses a relatively inexpensive base metal such as nickel or copper as the internal electrode material in order to reduce the manufacturing cost.

However, these base metals mentioned above are easily oxidized at a high temperature in an oxidizing atmosphere, and as a result, they cannot serve as the internal electrodes. In order to use a base metal as the internal electrodes for the laminated ceramic capacitor, firing for obtaining the laminated ceramic capacitor must be performed in a neutral or a reducing atmosphere.

In addition, when firing is performed at a low partial pressure of oxygen in the neutral or the reducing atmosphere described above, the ceramic compact for forming dielectric ceramic layers is significantly reduced, and as a result, a problem may occur in that the ceramic compact starts to have semiconductor characteristics.

Accordingly, as a reduction-resistant dielectric ceramic compact which is not likely to have semiconductor characteristics even though fired at a low partial pressure of oxygen for preventing oxidation of a base metal, for example, a $BaTiO_3$-$(Mg,Zn,Sr,Ca)O$-$B_2O_3$-$SiO_2$-based dielectric ceramic compact disclosed in Japanese Examined Patent Application Publication No. 61-14611, a $(Ba,M,L)(Ti,R)O_3$-based dielectric ceramic compact (in which M is Mg or Zn, L is Ca or Sr, and R is Sc, Y, or a rare earth element) disclosed in Japanese Unexamined Patent Application Publication No. 7-272971, and the like have been proposed.

Concomitant with trends toward higher integration, improved performance and lower price of electronic devices, laminated ceramic capacitors are increasingly subject to more adverse usage conditions, and hence, lower loss, improved insulating characteristics, improved breakdown voltages, improved reliability, larger capacity, lower price and the like are strongly required for the laminated ceramic capacitors.

In addition, laminated ceramic capacitors which can be used under high frequency conditions of high voltage or large current are increasingly in demand in recent years. The important properties required for these laminated ceramic capacitor are low loss and low heat generation. The reason for this is that when the loss and heat generation are large, the life of the laminated ceramic capacitor itself is decreased. Furthermore, due to the loss and the heat generation of the laminated ceramic capacitor, an increase in temperature occurs in the circuit containing them, and as a result, malfunctions of peripheral units and a decrease in life thereof also occur.

The laminated ceramic capacitors are also increasingly used under high DC voltage conditions. However, particularly in conventional laminated ceramic capacitors using nickel as an internal electrode material which are designed to be used under relatively low electric field conditions, when used under high electric field conditions, the insulating characteristics, breakdown voltage and reliability are degraded.

When a laminated ceramic capacitor is formed by using the dielectric ceramic compact disclosed in Japanese Examined Patent Application Publication No. 61-14611 or Japanese Unexamined Patent Application Publication No. 7-272971, even though the rate of change in static capacitance with temperature is not significant, there are shortcomings in that the loss and the heat generation are significant when used under high frequency conditions of high voltage or large current. In addition, since the dielectric ceramic compact described above is reduction-resistant, a base metal such as nickel can be used as the internal electrode material when firing at a low partial pressure of oxygen is performed; however, the firing at a low partial pressure of oxygen is hard firing for the dielectric ceramic compact, and for example, when an obtained laminated ceramic capacitor is used under high DC voltage conditions, there are shortcomings in that the insulating resistance is low and that the reliability is poor.

SUMMARY OF THE INVENTION

Accordingly, an object of the present invention is to provide a reduction-resistant dielectric ceramic compact for advantageously forming dielectric ceramic layers for use in, for example, a laminated ceramic capacitor, which has a low loss and low heat generation when used under high frequency conditions of high voltage or large current, and which exhibits a stable insulating resistance under AC or DC high temperature loading conditions.

Another object of the present invention is to provide, in addition to the object described above, a laminated ceramic capacitor which can use a base metal such as nickel or a nickel ally as an internal electrode material.

A reduction-resistant dielectric ceramic compact of the present invention comprises an auxiliary sintering agent and a solid solution comprising a barium titanate-based perovskite compound represented by the formula $ABO_3$ as a primary component.

In the reduction-resistant dielectric ceramic compact, the crystalline axis ratio c/a obtained by x-ray diffraction in a temperature range of $-25°$ C. or above satisfies $1.000 \leq c/a \leq 1.003$, and the maximum peak for temperature dependence of the dielectric constant measured at an electric strength of 2 Vrms/mm or less and at an AC frequency of 1 kHz is present at a temperature of below $-25°$ C.

The primary component described above is represented by the formula $ABO_3+aR+bM$.

In this formula described above, R is a compound containing at least one element selected from the group consisting of La, Ce, Pr, Nd, Sm, Eu, Gd, Tb, Dy, Ho, Er, Tm, Yb and Lu, M is a compound containing at least one element selected from the group consisting of Mn, Ni, Mg, Fe, Al, Cr and Zn, and a and b indicate the number of moles of the compounds mentioned above in the chemical formula each containing one element among the elements mentioned above.

In addition, in the formula described above, preferably $1.000<A/B \leq 1.035$, $0.005 \leq a \leq 0.12$, and $0.005 \leq b \leq 0.12$.

In the reduction-resistant dielectric ceramic compact of the present invention, about 0.2 to 4.0 parts by weight of the auxiliary sintering agent is preferably present with respect to 100 parts by weight of the primary component.

In addition, the primary component preferably comprises $X(Zr,Hf)O_3$ in the reduction-resistant dielectric ceramic compact of the present invention, in which X is at least one element selected from the group consisting of Ba, Sr and Ca. $X(Zr,Hf)O_3$ can range of from zero to about 0.20 mole with respect to 1 mole of $ABO_3$ in the primary component.

In the reduction-resistant dielectric ceramic compact of the present invention, the primary component preferably comprises D which is a compound containing at least one element selected from the group consisting of V, Nb, Ta, Mo, W, Y, Sc, P, Al, and Fe. In the case described above, D in the range of from zero to 0.02 mole is more preferably contained with respect to 1 mole of $ABO_3$ in the primary component.

In the reduction-resistant dielectric ceramic compact of the present invention, the primary component may comprise $X(Zr,Hf)O_3$ and D. With respect to 1 mole of $ABO_3$ in the primary component, it is preferable that $X(Zr,Hf)O_3$ be in the range of from zero to about 0.20 mole and the D be contained in the range of from zero to about 0.02 mole.

In the reduction-resistant dielectric ceramic compact of the present invention, when the barium titanate-based perovskite compound represented by $ABO_3$ is represented by the chemical formula $\{(Ba_{1-x-y}Sr_xCa_y)O\}_mTiO_2$, x, y and m preferably satisfy $0 \leq x+y \leq 0.20$ and $1.000<m \leq 1.035$, and with respect to 100 parts by weight of the barium titanate-based perovskite compound, it is preferable that compounds comprising at least one element selected from the group consisting of S, Na and K be in the range of about 0.5 part by weight or less calculated as $SO_3$, $Na_2O$ and $K_2O$, respectively, and comprising Cl be in the range of about 5 parts by weight or less.

In the reduction-resistant dielectric ceramic compact of the present invention, the auxiliary sintering agent preferably comprises a compound containing boron, a compound containing silicon and a compound containing boron and silicon. In particular, the compound containing silicon is preferably silicon oxide.

The present invention may be applied to a laminated ceramic capacitor comprising a plurality of dielectric ceramic layers, internal electrodes formed between the dielectric ceramic layers and external electrodes electrically connected to the internal electrodes. In the laminated ceramic capacitor described above, the dielectric ceramic layers comprise the reduction-resistant dielectric ceramic compact according to the present invention described above.

In the laminated ceramic capacitor of the present invention, the internal electrodes may be formed of nickel, a nickel alloy, copper or a copper alloy.

In addition, in the laminated ceramic capacitor of the present invention, the external electrodes may each comprise a first layer composed of a sintered layer containing a powdered conductive metal or of a sintered layer containing a powdered conductive metal and one of a glass frit, a crystallized glass and a ceramic; and a second layer which is disposed on the first layer and which is a plating layer.

DESCRIPTION OF THE PREFERRED EMBODIMENTS

Figure 1:
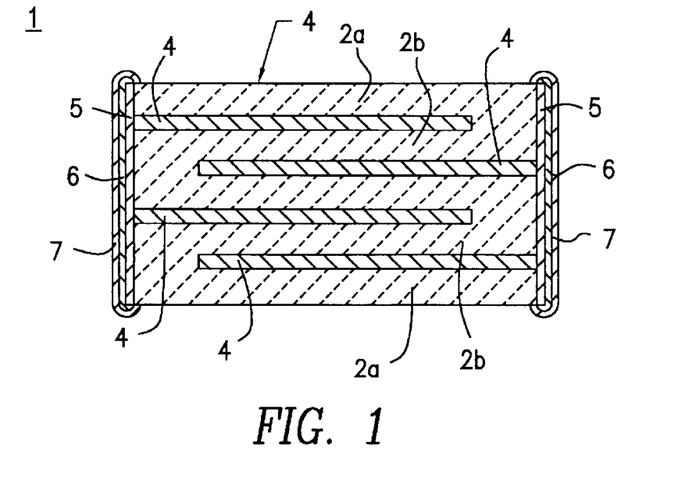
FIG. 1 is a cross-sectional view showing a laminated ceramic capacitor according to an embodiment of the present invention.
Figure 2:
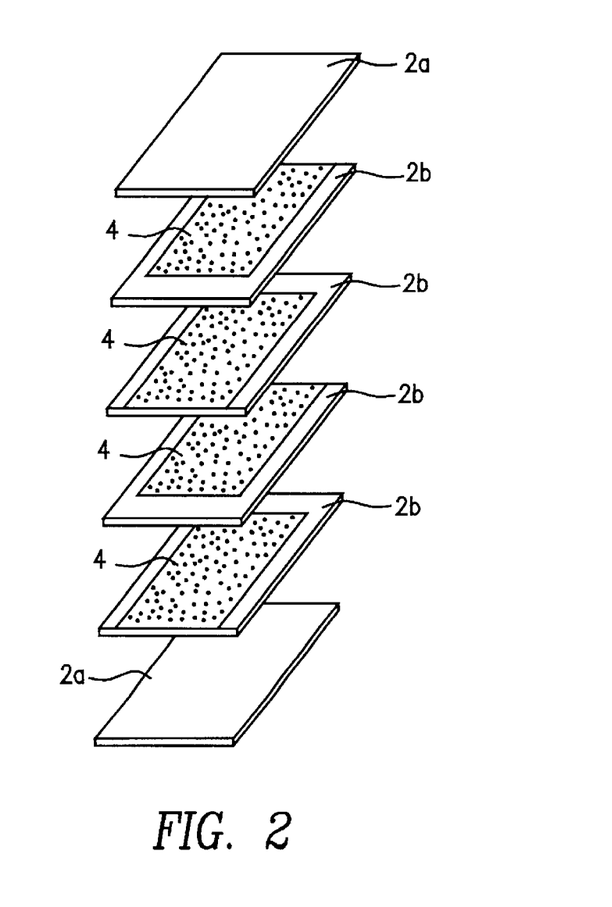
FIG. 2 is an exploded perspective view showing a ceramic laminate provided for the laminated ceramic capacitor shown in FIG. 1.

FIG. 1 is a cross-sectional view showing a laminated ceramic capacitor 1 according to an embodiment of the present invention, and FIG. 2 is an exploded perspective view showing a ceramic laminate 3 provided for the laminated ceramic capacitor 1 shown in FIG. 1.

The laminated ceramic capacitor 1 comprises the ceramic laminate 3 in the form of a rectangular parallelepiped obtained by laminating a plurality of dielectric ceramic layers 2a and 2b with internal electrodes 4 provided therebetween. On the two end surfaces of the ceramic laminate 3, external electrodes 5 are formed so as to be connected to predetermined internal electrodes 4, and on each external electrode 5, a first plating layer 6 composed of nickel, copper or the like is formed, and in addition, on each first plating layer 6, a second plating layer 7 composed of solder, tin or the like is formed.

Next, a method for manufacturing this laminated ceramic capacitor 1 will be described in the order of manufacturing steps.

First, a powdered barium titanate-based starting material, which is used as a primary component of the dielectric ceramic layers 2a and 2b, is prepared by weighing and mixing materials so as to have a predetermined composition. The composition of the powdered starting material will be described later.

Next, an organic binder is added to the powdered starting material thus formed so as to form a slurry and the slurry is molded to form sheets, thereby yielding ceramic green sheets for forming the dielectric ceramic layers 2a and 2b.

Subsequently, on one major surface of each ceramic green sheet used for the dielectric ceramic layer 2b, an internal electrode 4 is formed which contains a base metal, such as nickel, a nickel alloy, copper or a copper alloy, as a conductive component. These internal electrodes 4 may be formed by a printing method such as a screen printing method or may be formed by a deposition method or a plating method.

Next, the required number of ceramic green sheets for forming dielectric ceramic layers 2b provided with the internal electrodes 4 formed thereon are laminated to each other, and as shown in FIG. 2, these green sheets are provided between ceramic green sheets for forming dielectric ceramic layers 2a provided with no internal electrodes formed thereon and are bonded by compression, thereby yielding a green laminate.

Subsequently, the green laminate is fired at a predetermined temperature in a predetermined atmosphere, thereby yielding the ceramic laminate 3.

Next, on the two end surfaces of the ceramic laminate 3, the external electrodes 5 are formed so as to be electrically connected to predetermined internal electrodes 4. As a material for this external electrode 5, the same material as that for the internal electrode 4 may be used. In addition, silver, palladium, a silver-palladium alloy, copper, a copper alloy or the like may also be used, and in addition, a material may be used which is obtained by adding a glass frit, such as a $B_2O_3$-$SiO_2$-BaO-based glass or a $Li_2O$-$SiO_2$-BaO-based glass, a crystallized glass or a ceramic to the powdered metal mentioned above. In view of application of the laminated ceramic capacitor 1, the place at which the capacitor is used and like considerations, an appropriate material may be selected. In addition, the external electrode 5 is typically formed by steps of coating the ceramic laminate 3 obtained by firing with a paste containing a powdered metal and baking; however, the paste may be applied to the laminate before firing and may then be simultaneously fired with the ceramic laminate 3.

Subsequently, on the external electrodes 5, plating is performed using nickel, copper or the like so as to form the first plating layers 6. Finally, on these first plating layers 6, the second plating layers 7 composed of solder or tin are formed, whereby the laminated ceramic capacitor 1 is completed. In this connection, conductive layers further formed on the external electrodes 5 by plating or the like may be omitted depending on application of the laminated ceramic capacitor.

By firing the powdered barium titanate-based starting material for forming the dielectric ceramic layers 2a and 2b described above, the reduction-resistant dielectric ceramic compact, which comprises the auxiliary sintering agent and the solid solution comprising barium titanate as the primary component, is obtained as described above.

In this reduction-resistant dielectric ceramic compact, the crystalline axis ratio c/a obtained by x-ray diffraction in a temperature range of −25° C. or above satisfies $1.000 \leq c/a \leq 1.003$, and in temperature dependence of a relative dielectric constant measured at an electric strength of 2 Vrms/mm or less and at an AC frequency of 1 kHz, the maximum peak is present at −25° C. or below.

In addition, the primary component is represented by the formula $ABO_3 + aR + bM$.

In this formula, $ABO_3$ is a barium titanate-based perovskite compound having an A-site element and a B-site element. R is a compound containing at least one element selected from the group consisting of La, Ce, Pr, Nd, Sm, Eu, Gd, Tb, Dy, Ho, Er, Tm, Yb and Lu. M is a compound containing at least one element selected from the group consisting of Mn, Ni, Mg, Fe, Al, Cr and Zn. In addition, a and b each indicates the number of moles of the compound described above in the formula.

In addition, $1.000 < A/B \leq 1.035$, $0.005 \leq a \leq 0.12$, and $0.005 \leq b \leq 0.12$.

By using the reduction-resistant dielectric ceramic compact described above for forming the dielectric ceramic layers 2a and 2b, in the laminated ceramic capacitor 1 thus obtained, the loss and the heat generation under high frequency conditions of high voltage or large current can be decreased, and in addition, the insulating resistance can be stabilized under AC or DC high temperature loading conditions. Furthermore, a base metal such as nickel or a nickel alloy can be satisfactory used as the material for the internal electrode 4.

The content of the auxiliary sintering agent contained in this reduction-resistant dielectric ceramic compact is preferably in the range of about 0.2 to 4.0 parts by weight with respect to 100 parts by weight of the primary component, and more preferably, in the range of about 0.5 to 2 parts by weight. When the content is less than about 0.2 part by weight, insufficient sintering may occur in the fired reduction-resistant dielectric ceramic compact in some cases, and on the other hand, when the content is more than about 4.0 parts by weight, the average life time of the laminated ceramic capacitor 1 in a high temperature loading test may be decreased in some cases.

As the auxiliary sintering agent, for example, a compound containing boron, a compound containing silicon or a compound containing boron and silicon is used. In particular, as the compound containing silicon, silicon oxide is advantageously used.

In addition, when the primary component comprises $X(Zr, Hf)O_3$ (in which X is at least one element selected from the group consisting of Ba, Sr and Ca) and/or D (in which D is a compound containing at least one element selected from the group consisting of V, Nb, Ta, Mo, W, Y, Sc, P, Al and Fe), the features described above can be further improved. In this case, it is preferable that $X(Zr, Hf)O_3$ be in the range of from zero to about 0.20 mole and that D be in the range of from zero to about 0.02 mole with respect to 1 mole of $ABO_3$ in the primary component.

The ratio of Zr to Hf in the X(Zr, Hf) described above is not specifically limited; however, in order to obtain superior sintering characteristics, the ratio of Hf is preferably about 30 mole percent or less.

In the barium carbonate and titanium oxide which are used for forming this reduction-resistant dielectric ceramic compact, S, Na, K, Cl and the like are contained as impurities. When the barium titanate-based perovskite compound represented by $ABO_3$ is represented by the chemical formula $\{(Ba_{1-x-y}Sr_xCa_y)O\}_m TiO_2$, it is preferable that x, y, and m satisfy $0 \leq x+y \leq 0.2$ and $1.000 < m \leq 1.035$. In addition, with respect to 100 parts by weight of this barium titanate-based perovskite compound, it is preferably that compounds containing at least one element selected from the group consisting of S, Na and K contain about 0.5 part by weight or less thereof as $SO_3$, $Na_2O$, and $K_2O$, respectively, and that about 5 parts by weight or less of Cl is present. When S, Na, K and Cl are contained in greater amounts in the parts by weight mentioned above, the sintering may vary, resulting in variation in capacitance of the laminated ceramic capacitor 1.

By using the reduction-resistant dielectric ceramic compact described above for forming the dielectric ceramic layers 2a and 2b in the obtained laminated ceramic capacitor 1, the loss and the heat generation can be decreased under high frequency conditions of high voltage or large current, and in addition, the insulating resistance can be stabilized under AC or DC high temperature loading conditions. Furthermore, a base metal such as nickel or a nickel alloy can be satisfactory used as the internal electrode material 4.

Next, the reduction-resistant dielectric ceramic compact and the laminated ceramic capacitor according to the present invention will be described in more detail with reference to examples.

EXAMPLE 1

In this example, reduction-resistant dielectric ceramic compacts having a composition represented by the formula $\{(Ba_{1-x-y}Sr_xCa_y)O\}_mTiO_2+aR+bM$ are to be obtained.

First, as starting materials, powdered $BaCO_3$, $CaCO_3$, $SrCO_3$ and $TiO_2$ were prepared each having a purity of 98%.

Next, the powdered starting materials described above were weighed so that $\{(Ba_{1-x-y}Sr_xCa_y)O\}_mTiO_2$, a type of barium titanate-based solid solution represented by $ABO_3$ showing a perovskite structure, had a composition in which the molar ratios of x, y, and m were in accordance with those shown in Table 1. Subsequently, the starting materials thus weighed were wet-mixed by using a ball mill, and after pulverizing and drying were performed, calcining was performed at 1,120° C. for 2 hours in the air, whereby a barium titanate-based solid solution was obtained.

As a starting material for R (in which R was a compound containing at least one element selected from the group consisting of La, Ce, Pr, Nd, Sm, Eu, Gd, Tb, Dy, Ho, Er, Tm, Yb and Lu), powdered $La_2O_3$, $CeO_2$, $Pr_6O_{11}$, $Nd_2O_3$, $Sm_2O_3$, $EU_2O_3$, $Gd_2O_3$, $Tb_4O_7$, $Dy_2O_3$, $Ho_2O_3$, $Er_2O_3$, $Tm_2O_3$, $Yb_2O_3$ and $Lu_2O_3$ were prepared each having a purity of 99% or more.

As a starting material for M (in which M is a compound containing at least one element selected from the group consisting of Mn, Ni, Mg, Fe, Al, Cr and Zn), powdered MnO, NiO, MgO, $Fe_2O_3$, $Al_2O_3$, $Cr_2O_3$ and ZnO were prepared each having a purity of 99% or more.

As an auxiliary sintering agent, four types described below were prepared.

Oxides, carbonate salts and hydroxides for individual components were weighted, mixed and pulverized so that, first, a $0.55B_2O_3$-$0.25Al_2O_3$-$0.03MnO$-$0.17BaO$ (hereinafter referred to as an auxiliary sintering agent ①) was obtained as an example of a compound containing boron; secondly, $0.25Li_2O$-$0.65(0.3TiO_2.0.7SiO_2)$-$Al_2O_3$ (hereinafter referred to as an auxiliary sintering agent ②) was obtained as an example of a compound containing silicon; and thirdly, $0.25Li_2O$-$0.30B_2O_3$-$0.03TiO_2$-$0.42SiO_2$ (hereinafter referred to as an auxiliary sintering agent ③) was obtained as an example of a compound containing silicon and boron; whereby powdered materials were obtained. After the powdered materials thus obtained were each heated to 1,500° C. in a platinum crucible, by quenching and pulverizing, individual powdered oxides having an average particle diameter of 1 µm or less were obtained. In addition, fourthly, as another example of a compound containing silicon, a colloidal silica solution (hereinafter referred to as an auxiliary sintering agent ④) containing 30 wt % of silicon oxide as $SiO_2$ was obtained.

Next, the barium titanate-based solid solutions thus prepared and the starting materials for the other components were weighed so as to obtain the compositions shown in Table 1.

In Table 1, the factor a for R and the factor b for M indicates the number of moles of each in the chemical formula. Furthermore, the content of the auxiliary sintering agent is represented by the parts by weight with respect to 100 parts by weight of the primary component $\{(Ba_{1-x-y}Sr_xCa_y)O\}_mTiO_2+aR+bM$.

TABLE 1

| Sample No. | x | y | x + y | a(Molar Ratio) R(Oxide of Element) | | | | | Total of a | b(Molar Ratio) M(Oxide of Element) | | | | | Total of b | m | Auxiliary Sintering Agent (Parts by Weight) | | | |
|---|---|---|---|---|---|---|---|---|---|---|---|---|---|---|---|---|---|---|---|---|
| | | | | | | | | | | | | | | | | | ① | ② | ③ | ④ |
| 1 | 0 | 0 | 0 | Eu | 0.05 | Yb | 0.05 | | 0.1 | Mg | 0.05 | Mn | 0.05 | | 0.1 | 1.000 | 0 | 2 | 0 | 0 |
| 2 | 0.05 | 0.05 | 0.1 | Gd | 0.08 | | | | 0.08 | Mn | 0.1 | | | | 0.1 | 1.055 | 4 | 0 | 0 | 0 |
| 3 | 0 | 0.05 | 0.05 | Nd | 0.003 | | | | 0.003 | Ni | 0.005 | | | | 0.005 | 1.010 | 0 | 0 | 0 | 2 |
| 4 | 0.1 | 0.08 | 0.18 | Gd | 0.1 | Ho | 0.05 | | 0.15 | Mg | 0.05 | Ni | 0.05 | | 0.1 | 1.015 | 0 | 0 | 0 | 3 |
| 5 | 0.04 | 0.08 | 0.12 | Tb | 0.01 | | | | 0.01 | Fe | 0.001 | Mn | 0.002 | | 0.003 | 1.010 | 1 | 0 | 0 | 0 |
| 6 | 0 | 0.08 | 0.08 | Eu | 0.05 | Ce | 0.05 | | 0.1 | Al | 0.10 | Mg | 0.04 | | 0.14 | 1.005 | 0 | 0.5 | 0 | 0 |
| 7 | 0 | 0 | 0 | Tb | 0.09 | | | | 0.09 | Mg | 0.05 | Mn | 0.05 | | 0.1 | 1.030 | 0.15 | 0 | 0 | 0 |
| 8 | 0.01 | 0.04 | 0.05 | Dy | 0.03 | Pr | 0.03 | | 0.06 | Cr | 0.04 | Mg | 0.04 | | 0.08 | 1.020 | 0 | 5 | 0 | 0 |
| 9 | 0.02 | 0.23 | 0.25 | Gd | 0.04 | | | | 0.04 | Fe | 0.005 | Mg | 0.045 | | 0.05 | 1.010 | 0 | 0 | 1 | 0 |
| 10 | 0 | 0 | 0 | Sm | 0.08 | Tm | 0.01 | La | 0.02 | 0.11 | Mn | 0.05 | Mg | 0.05 | | 0.1 | 1.035 | 0 | 0 | 0 | 4 |
| 11 | 0.01 | 0.04 | 0.05 | Gd | 0.004 | Tb | 0.001 | | 0.005 | Mg | 0.01 | | | | 0.01 | 1.010 | 0 | 2 | 0 | 0 |
| 12 | 0.05 | 0.05 | 0.1 | Gd | 0.1 | Dy | 0.02 | | 0.12 | Mg | 0.04 | Ni | 0.03 | Al | 0.03 | 0.1 | 1.015 | 0 | 0 | 2 | 0 |
| 13 | 0.04 | 0.05 | 0.09 | Tb | 0.04 | Nd | 0.02 | | 0.06 | Mn | 0.005 | | | | 0.005 | 1.010 | 1 | 0 | 0 | 0 |
| 14 | 0.12 | 0 | 0.12 | Er | 0.03 | Yb | 0.03 | Lu | 0.02 | 0.08 | Al | 0.02 | Mg | 0.05 | Ni | 0.05 | 0.12 | 1.015 | 0 | 0 | 0 | 2 |
| 15 | 0.1 | 0.04 | 0.14 | Sm | 0.06 | Lu | 0.02 | | 0.08 | Cr | 0.02 | Mn | 0.03 | | 0.05 | 1.020 | 0 | 0 | 0.2 | 0 |
| 16 | 0 | 0 | 0 | Tb | 0.05 | Ce | 0.01 | | 0.06 | Mg | 0.07 | | | | 0.07 | 1.010 | 0 | 0 | 4 | 0 |
| 17 | 0.1 | 0.1 | 0.2 | Gd | 0.07 | Ho | 0.02 | | 0.09 | Mn | 0.1 | | | | 0.1 | 1.015 | 3 | 0 | 0 | 0 |
| 18 | 0.03 | 0.1 | 0.13 | Dy | 0.1 | | | | 0.1 | Zn | 0.05 | Mg | 0.05 | | 0.1 | 1.010 | 0 | 2 | 0 | 0 |

Next, a polyvinyl butyral-based binder and an organic solvent such as ethanol were added to each of the mixtures prepared for forming the samples described above and each mixture was then wet-mixed by using a ball mill, thereby forming a slurry. The ceramic slurry was then sheet-molded by the doctor blade method, thereby obtaining rectangular ceramic green sheets 25 µm thick.

Next, a conductive paste primarily composed of nickel was printed on predetermined ceramic green sheets, whereby conductive paste layers for forming internal electrodes were formed.

Subsequently, the ceramic green sheets provided with the conductive paste layers formed thereon were laminated to each other so that the sides, at which the conductive paste layers extend, of ceramic green sheets adjacent to each other were opposite to each other, and ceramic green sheets having no conductive paste layers formed thereon were placed on the top and the bottom of the laminate thus formed and were then bonded together by compression, whereby a green laminate was obtained.

Next, the green ceramic laminate was heated to 350° C. in a nitrogen atmosphere so as to remove the binder and was then fired at a temperature shown in Table 2 for 2 hours in a reducing atmosphere composed of a $H_2$-$N_2$-$H_2O$ gas at an oxygen partial pressure of $10^{-9}$ to $10^{-12}$ MPa, whereby a sintered ceramic laminate was obtained.

Subsequently, both end surfaces of the sintered ceramic laminate were coated with a conductive paste composed of a $B_2O_3$-$Li_2O$-$SiO_2$-$BaO$-based glass frit and powdered copper and was then fired at 750° C. in a nitrogen atmosphere, whereby external electrodes electrically connected to the internal electrodes were formed.

Next, a nickel plating solution composed of nickel sulfate, nickel chloride and boric acid was prepared, and nickel plating was performed on the external electrodes by the barrel plating method. Finally, a solder plating solution composed of an alkanol-sulfonic acid bath (AS bath) was prepared, and solder plating was performed on the nickel plating film described above, whereby a predetermined laminated ceramic capacitor was obtained.

The dimensions of the laminated ceramic capacitor thus obtained were such that the width was 3.2 mm, the length was 4.5 mm and the thickness was 1.0 mm, and the thickness of the dielectric ceramic layer provided between the internal electrodes was 20 μm. The effective opposing area of the internal electrode was $8.8 \times 10^{-6}$ m$^2$, and the total number of the effective dielectric ceramic layers was adjusted so as to have a static capacitance of 50 nF.

Next, characteristics of the laminated ceramic capacitors thus formed and the dielectric ceramic compacts forming the dielectric ceramic layers were measured, and the results are shown in Table 2.

obtained and the temperature exhibiting a steep maximum value (the maximum value of the peaks) of the rate of change in static capacitance was defined as the phase transition temperature. The rate of change in static capacitor with temperature was measured at an effective voltage of 0.02 Vrms and at a frequency of 1 KHz on the basis of the static capacitance at a temperature of 25° C.

Concerning the relative dielectric constant, the static capacitance of the laminated ceramic capacitor was measured at a frequency of 1 KHz, at an effective voltage of 1 Vrms and at a temperature of 25° C. using an automatic bridge type measuring instrument, and the relative dielectric constant was calculated from this static capacitance.

The generation characteristic, which was to evaluate the increase in temperature, was obtained by steps of electrically connecting a laminated ceramic capacitor disposed in a temperature controlled bath at 25° C. to an AC power supply, continuously applying a high voltage of 100 Vp-p at a high frequency of 100 kHz to the laminated ceramic capacitor for 5 minutes, and measuring the difference between the temperature of the laminated ceramic capacitor and the ambient temperature in the vicinity thereof using an infrared thermometer.

The CR product was obtained as a product of an insulating resistance measured at an electric field of 10 kV/mm and at a temperature of 25° C. and the static capacitance measured under conditions of 1 Vrms at 1 kHz.

The AC loading test was to evaluate a ratio of samples having defects in insulating resistance, that is, a defect rate. After a high voltage of 100 Vp-p at a high frequency of 100 KHz was applied to a laminated ceramic capacitor placed in a temperature controlled oven at 100° C., and the laminated

TABLE 2

| Sample No. | Firing Temperature (° C.) | c/a -25° C. | c/a +25° C. | Phase Transition Temperature (° C.) | Relative Dielectric Constant | Heat Generation (° C.) | CR Product (Ω × F) | AC Loading Test Defect Rate (%) | High Temperature Loading Test (Hour) |
|---|---|---|---|---|---|---|---|---|---|
| 1 | 1250 | 1.000 | 1.000 | −60 | 1020 | 12 | 4700 | 80 | 30 |
| 2 | 1370 | | | Not Measurable due to Insufficient Sintering | | | | | |
| 3 | 1300 | 1.006 | 1.000 | −15 | 2060 | 80 | 6000 | 0 | 850 |
| 4 | 1300 | 1.000 | 1.000 | <−60 | 530 | 5 | 3500 | 0 | 810 |
| 5 | 1300 | 1.004 | 1.000 | −15 | 1810 | 50 | 5600 | 70 | 10 |
| 6 | 1350 | 1.001 | 1.000 | −60 | 1040 | 12 | 4600 | 80 | 20 |
| 7 | 1370 | | | Not Measurable due to Insufficient Sintering | | | | | |
| 8 | 1250 | 1.000 | 1.000 | −60 | 1500 | 15 | 5300 | 0 | 5 |
| 9 | 1300 | 1.000 | 1.000 | −40 | 1610 | 15 | 5400 | 10 | 700 |
| 10 | 1300 | 1.000 | 1.000 | −60 | 1020 | 12 | 4700 | 0 | 910 |
| 11 | 1250 | 1.000 | 1.000 | −27 | 1920 | 19 | 6000 | 0 | 880 |
| 12 | 1250 | 1.001 | 1.000 | <−60 | 800 | 8 | 4200 | 0 | 820 |
| 13 | 1300 | 1.000 | 1.000 | −50 | 1060 | 11 | 4700 | 0 | 790 |
| 14 | 1300 | 1.000 | 1.000 | <−60 | 910 | 10 | 4600 | 0 | 840 |
| 15 | 1350 | 1.000 | 1.000 | <−60 | 900 | 10 | 4600 | 0 | 800 |
| 16 | 1200 | 1.001 | 1.000 | −40 | 1530 | 15 | 5300 | 0 | 920 |
| 17 | 1250 | 1.000 | 1.000 | −60 | 1110 | 11 | 4700 | 0 | 780 |
| 18 | 1250 | 1.000 | 1.000 | <−60 | 950 | 10 | 4600 | 0 | 820 |

In Table 2, the crystalline axis ratio c/a was obtained by steps of performing x-ray diffraction of the dielectric ceramic compact forming the dielectric ceramic layer, and performing x-ray profile fitting using Rietveld analysis on the result so as to precisely determine the lattice constants.

Concerning the phase transition temperature, the static capacitance of the laminated ceramic capacitor was measured using an automatic bridge type measuring instrument, the rate of change in static capacitance with temperature was ceramic capacitor was then taken from the temperature controlled oven after an elapse of 250 hours, the insulating resistance was measured at a DC 500 V and at a temperature of 25° C., and a capacitor having a resistance of $10^6$ Ω or less was defined as the defect.

In the high temperature loading test, the insulating resistances of thirty six laminated ceramic capacitors of each sample were measured by applying a DC 500 V thereto at a temperature of 150° C., times when the insulating resistances of the capacitors reached $10^6$ Ω or less were defined as a life time, and the average life time was calculated by averaging the life times thus obtained.

In samples 10 to 18 which were within the scope of the present invention, as shown in Table 1, when the barium titanate-based solid solution was represented by the formula $\{(Ba_{1-x-y}Sr_xCa_y)O\}_mTiO_2+aR+bM$, x+y were in the range of from zero to about 0.20, a was in the range of from about 0.005 to 0.12, b was in the range of from about 0.005 to 0.12, m satisfied 1.000<m≦1.035, and the auxiliary sintering agent was contained at a content of about 0.2 to 4.0 parts by weight.

For samples 10 to 18, firing could be performed at 1,300° C. or less, and hence, a base metal such as nickel could be used as the internal electrode material. In addition, the crystalline axis ratio c/a obtained by x-ray diffraction at −25° C. or above satisfied 1.000≦c/a≦1.003 and the phase transition temperature was below −25° C. In addition, the CR product showed a high value, such as 4,000 Ω·F or more; the heat generation (increase in temperature) was small, such as 20° C. or less; the defect rate by the AC loading test could be suppressed to be 0%; and by the high temperature loading test, an average life time of 700 hours or more could be ensured.

On the other hand, in sample 1, where m was 1.000, as shown in Table 2, the defect rate was high in the AC loading test and in addition, the average life time was short in the high temperature loading test.

In sample 2, where m was more than 1.035, sufficient sintering could not be performed as shown in Table 2.

Sample 3, as shown in Table 1, has an a of less than 0.005, and as shown in Table 2, the relative dielectric constant was approximately 2,000, the phase transition temperature was higher than −25° C., the ratio c/a at −25° C. was relatively high, such as more than 1.003, and as a result, the heat generation (increase in temperature) was increased.

In sample 4, as shown in Table 1, a was more than 0.12, and as shown in Table 2, the relative dielectric constant was decreased to approximately 500.

In sample 5, as shown in Table 1, b was less than 0.005, and as shown in Table 2, the phase transition temperature was higher than −25° C. and the ratio c/a at −25° C. was relatively high, such as more than 1.003; hence, as a result, the defect rate in the AC loading test was high, and the average life time was short in the high temperature loading test.

In sample 6 where b was more than 0.12, as shown in Table 2, the firing temperature was increased to 1,350° C., the defect rate was high in the AC loading test, and in addition, the average life time was short in the high temperature loading test.

In sample 7, as shown in Table 1, the content of the auxiliary sintering agent was less than about 0.2 part by weight, and hence, as shown in Table 2, sufficient sintering could not be performed.

In sample 8 where the content of the auxiliary sintering agent was more than about 4.0 parts by weight, the average life time by the high temperature loading test was short as shown in Table 2.

In sample 9, as shown in Table 1, x+y was more than 0.20, and as shown in Table 2, the defect rate by the AC loading test was relatively high.

EXAMPLE 2

In this example, reduction-resistant dielectric ceramic compacts having a composition represented by the formula $\{(Ba_{1-x-y}Sr_xCa_y)O\}_mTiO_2+aR+bM+cX(Zr, Hf)O_3$ are to be obtained.

First, as starting materials, powdered $BaCO_3$, $CaCO_3$, $SrCO_3$ and $TiO_2$ were prepared each having a purity of 98%. Next, $\{(Ba_{1-x-y}Sr_xCa_y)O\}_mTiO_2$, a type of barium titanate-based solid solution represented by $ABO_3$ showing a perovskite structure, was formed in a manner equivalent to that in the first example so as to have a composition in which the molar ratios of x, y and m were in accordance with those shown in Table 3.

As a starting material for R, powdered $Sm_2O_3$, $Eu_2O_3$, $Gd_2O_3$, $Tb_4O_7$, $Dy_2O_3$, $Yb_2O_3$ and $Lu_2O_3$ were prepared each having a purity of 99% or more.

As a starting material for M, powdered MnO, NiO, MgO and $Al_2O_3$ were prepared each having a purity of 99% or more.

In addition, as a starting material for $X(Zr, Hf)O_3$ in which X is at least one element selected from the group consisting of Ba, Sr and Ca, powdered $BaZrO_3$, $SrZrO_3$ and $CaZrO_3$ were prepared.

In a manner equivalent to that in the first example, the auxiliary sintering agents ①, ②, ③, and ④ were prepared.

Next, the barium titanate-based solid solutions thus prepared and the starting materials for the other components were weighed so as to obtain the compositions shown in Table 3.

In Table 3, the factor a of R and the factor b of M are shown in a manner equivalent to that in Table 1 and by the same units as that in Table 1. In addition, the factor c of $X(Zr, Hf)O_3$ indicates a molar ratio with respect to 1 mole of $\{(Ba_{1-x-y}Sr_xCa_y)O\}_mTiO_2$ in the primary component. Furthermore, the content of the auxiliary sintering agent is represented by the parts by weight with respect to 100 parts by weight of the primary component $\{(Ba_{1-x-y}Sr_xCa_y)O\}_mTiO_2+aR+bM+cX(Zr, Hf)O_3$.

TABLE 3

| Sample No. | x | y | x + y | a (Molar Ratio) R (Oxide of Element) | | | | | | Total of a | b (Molar Ratio) M (Oxide of Element) | | | | | | Total of b | m |
|---|---|---|---|---|---|---|---|---|---|---|---|---|---|---|---|---|---|---|
| 101 | 0 | 0 | 0 | Eu | 0.07 | | | | | 0.07 | Mg | 0.05 | Mn | 0.03 | | | 0.08 | 1.005 |
| 102 | 0.05 | 0.1 | 0.15 | Sm | 0.03 | Yb | 0.03 | | | 0.06 | Mn | 0.05 | Mg | 0.02 | | | 0.07 | 1.010 |
| 103 | 0 | 0.1 | 0.1 | Sm | 0.03 | Tb | 0.01 | | | 0.04 | Mn | 0.04 | | | | | 0.04 | 1.015 |
| 104 | 0.01 | 0.04 | 0.05 | Gd | 0.01 | | | | | 0.01 | Mg | 0.01 | Al | 0.01 | | | 0.02 | 1.010 |
| 105 | 0.05 | 0.05 | 0.1 | Gd | 0.02 | Dy | 0.01 | | | 0.03 | Mg | 0.03 | Ni | 0.01 | | | 0.04 | 1.010 |
| 106 | 0.05 | 0.05 | 0.1 | Tb | 0.03 | Yb | 0.01 | Lu | 0.01 | 0.05 | Mn | 0.05 | | | | | 0.05 | 1.010 |
| 107 | 0.12 | 0 | 0.12 | Gd | 0.05 | Dy | 0.05 | | | 0.1 | Al | 0.02 | Mg | 0.05 | Ni | 0.04 | 0.11 | 1.005 |

TABLE 3-continued

| Sample | c(Molar Ratio) | | | | Auxiliary Sintering Agent (Parts by Weight) | | | |
|---|---|---|---|---|---|---|---|---|
| No. | Ca | Sr | Ba | Total of c | ① | ② | ③ | ④ |
| 101 | 0.02 | 0.03 | 0.20 | 0.25 | 2 | 0 | 0 | 0 |
| 102 | 0 | 0.05 | 0.25 | 0.30 | 0 | 0 | 2 | 0 |
| 103 | 0 | 0 | 0.05 | 0.05 | 0 | 1.5 | 0 | 0 |
| 104 | 0.02 | 0.02 | 0.08 | 0.12 | 0 | 0 | 2 | 0 |
| 105 | 0 | 0 | 0.20 | 0.20 | 0 | 0 | 3 | 0 |
| 106 | 0.05 | 0 | 0.10 | 0.15 | 2 | 0 | 0 | 0 |
| 107 | 0 | 0.05 | 0.05 | 0.10 | 0 | 1 | 0 | 0 |

Subsequently, laminated ceramic capacitors to be used as samples were formed in a manner equivalent to than in the first example. In addition, in a manner equivalent to that in the first example, characteristics of the laminated ceramic capacitors and the dielectric ceramic compacts forming dielectric ceramic layers were measured. The results are shown in Table 4.

TABLE 4

| Sample No. | Firing Temperature (° C.) | c/a −25° C. | c/a +25° C. | Phase Transition Temperature (° C.) | Relative Dielectric Constant | Heat Generation (° C.) | CR Product (Ω × F) | AC Loading Test Defect Rate (%) | High Temperature Loading Test (Hour) |
|---|---|---|---|---|---|---|---|---|---|
| 101 | 1250 | 1.000 | 1.000 | <−60 | 310 | 5 | 21000 | 0 | 720 |
| 102 | 1250 | 1.000 | 1.000 | <−60 | 250 | 5 | 20000 | 0 | 750 |
| 103 | 1250 | 1.000 | 1.000 | <−60 | 1420 | 15 | 8000 | 0 | 1030 |
| 104 | 1250 | 1.000 | 1.000 | <−60 | 1200 | 14 | 12000 | 0 | 1080 |
| 105 | 1200 | 1.000 | 1.000 | <−60 | 780 | 10 | 17000 | 0 | 840 |
| 106 | 1250 | 1.000 | 1.000 | <−60 | 1110 | 13 | 14000 | 0 | 1050 |
| 107 | 1300 | 1.000 | 1.000 | <−60 | 1250 | 14 | 10000 | 0 | 1020 |

In Tables 3 and 4, samples 101 and 102 were samples in which the content c of $X(Zr, Hf)O_3$ was more than about 0.20 mole.

In samples 101 to 107, when the barium titanate-based solid solution was represented by the formula $\{(Ba_{1-x-y}Sr_xCa_y)O\}_mTiO_2+aR+bM+cX(Zr, Hf)O_3$, x+y was in the range of from zero to about 0.20, a was in the range of from about 0.005 to 0.12, b was in the range of from about 0.005 to 0.12, m satisfied $1.000 < m \leq 1.035$, and in addition, the auxiliary sintering agent was contained in the range of from about 0.2 to 4.0 parts by weight.

For samples 101 to 107, as shown in Table 4, sintering could be performed at 1,300° C. or less, and hence, a base metal such as nickel could be used as the internal electrode material. In addition, the crystalline axis ratio c/a obtained by x-ray diffraction in a temperature range of −25° C. or above satisfied $1.000 \leq c/a \leq 1.003$, and the phase transition temperature was below −25° C. Furthermore, the CR product showed a high value of 8,000 Ω·F or more; the heat generation (increase in temperature) was small, such as 20° C. or less; the defect rate in the AC loading test could be suppressed to be 0%; and in the high temperature loading test, an average life time of 700 hours or more could be ensured.

However, according to samples 101 and 102, since the content c of $X(Zr, Hf)O_3$ was more than about 0.20 mole, the relative dielectric constant was less than about 400, and in addition, the average life time in the high temperature loading test was relatively short, such as less than 800 hours. In samples 103 to 107, since the content c of $X(Zr, Hf)O_3$ was less than about 0.20 mole, the relative dielectric constant was more than 700, and in addition, the average life time was more than 800 hours.

EXAMPLE 3

In this example, reduction-resistant dielectric ceramic compacts having a composition represented by the formula $\{(Ba_{1-x-y}Sr_xCa_y)O\}_mTiO_2+aR+bM+dD$ are to be obtained.

First, as starting materials, powdered $BaCO_3$, $CaCO_3$, $SrCO_3$ and $TiO_2$ were prepared each having a purity of 98%, and in the composition represented by the formula $\{(Ba_{1-x-y}Sr_xCa_y)O\}_mTiO_2+aR+bM+dD$, $\{(Ba_{1-x-y}Sr_xCa_y)O\}_mTiO_2$, a type of barium titanate-based solid solution represented by $ABO_3$ showing a perovskite structure, was formed in a manner equivalent to that in the first example so as to have a composition in which the molar ratios of x, y, and m were in accordance with those shown in Table 5.

As a starting material for R, powdered $Sm_2O_3$, $Eu_2O_3$, $Gd_2O_3$, $Tb_4O_7$, $Dy_2O_3$, $Yb_2O_3$ and $Lu_2O_3$ were prepared each having a purity of 99% or more.

As a starting material for M, powdered MnO, NiO, MgO and $Al_2O_3$ were prepared each having a purity of 99% or more.

In addition, as a starting material for D (in which D is a compound containing at least one element selected from the group consisting of V, Nb, Ta, Mo, W, Y, Sc, P, Al and Fe), powdered $V_2O_5$, $Nb_2O_5$, $Ta_2O_5$, $MoO_3$, $WO_3$, $Y_2O_3$, $Sc_2O_3$, $P_2O_5$, $Al_2O_3$ and $Fe_2O_3$ were prepared.

In a manner equivalent to that in the first example, the auxiliary sintering agents ①, ②, ③, and ④ were prepared.

Next, the barium titanate-based solid solutions thus prepared and the starting materials for the other components were weighed so as to obtain the compositions shown in Table 5.

In Table 5, the factor a of R and the factor b of M are shown in a manner equivalent to that in Table 1 and by the same units as that in Table 1. In addition, the factor d of D indicates a molar ratio with respect to 1 mole of $\{(Ba_{1-x-y}Sr_xCa_y)O\}_m TiO_2$ in the primary component. Furthermore, the content of the auxiliary sintering agent is represented by the parts by weight with respect to 100 parts by weight of the primary component $\{(Ba_{1-x-y}Sr_xCa_y)O\}_m TiO_2 + aR + bM + dD$.

metal such as nickel could be used as the internal electrode material. In addition, the crystalline axis ratio c/a obtained by x-ray diffraction in a temperature range of −25° C. or above satisfied $1.000 \leq c/a \leq 1.003$ and the phase transition temperature was below −25° C. Furthermore, the CR prod-

TABLE 5

| Sample No. | x | y | x + y | a(Molar Ratio) R (Oxide of Element) | | | | | Total of a | b(Molar Ratio) M (Oxide of Element) | | | | | Total of b |
|---|---|---|---|---|---|---|---|---|---|---|---|---|---|---|---|
| 201 | 0 | 0 | 0 | Sm | 0.03 | Dy | 0.03 | | 0.06 | Mg | 0.05 | Mn | 0.02 | | 0.07 |
| 202 | 0.01 | 0.04 | 0.05 | Eu | 0.03 | Yb | 0.02 | Lu 0.01 | 0.06 | Mn | 0.04 | Mg | 0.02 | Ni 0.01 | 0.07 |
| 203 | 0.05 | 0.05 | 0.1 | Gd | 0.02 | Tb | 0.01 | | 0.03 | Mn | 0.04 | | | | 0.04 |
| 204 | 0.04 | 0.05 | 0.09 | Gd | 0.02 | | | | 0.02 | Mg | 0.01 | Al | 0.01 | | 0.02 |
| 205 | 0.12 | 0 | 0.12 | Gd | 0.02 | Dy | 0.02 | | 0.04 | Mg | 0.03 | Ni | 0.01 | | 0.04 |
| 206 | 0.1 | 0.04 | 0.14 | Eu | 0.03 | Yb | 0.02 | | 0.05 | Mn | 0.04 | Ni | 0.02 | | 0.06 |
| 207 | 0 | 0 | 0 | Gd | 0.09 | | | | 0.09 | Al | 0.05 | Mg | 0.05 | | 0.1 |

| Sample No. | d(Molar Ratio) Element D | | | | Total of d | m | Auxiliary Sintering Agent (Parts by Weight) | | | |
|---|---|---|---|---|---|---|---|---|---|---|
| | | | | | | | ① | ② | ③ | ④ |
| 201 | Mo | 0.03 | | | 0.03 | 1.010 | 0 | 2 | 0 | 0 |
| 202 | Sc | 0.03 | V | 0.005 | 0.035 | 1.010 | 0 | 0 | 0 | 2.5 |
| 203 | W | 0.005 | | | 0.005 | 1.015 | 0 | 2 | 0 | 0 |
| 204 | Ta | 0.02 | | | 0.02 | 1.010 | 1.5 | 0 | 0 | 0 |
| 205 | Fe | 0.005 | P | 0.005 | 0.01 | 1.010 | 0 | 0 | 2.2 | 0 |
| 206 | Al | 0.015 | | | 0.015 | 1.020 | 0 | 0 | 0 | 2.5 |
| 207 | Nb | 0.01 | Y | 0.005 | 0.015 | 1.010 | 0 | 2 | 0 | 0 |

Subsequently, in a manner equivalent to than in the first example, laminated ceramic capacitors to be used as samples were formed. In addition, in a manner equivalent to that in the first example, characteristics of the laminated ceramic capacitors and the dielectric ceramic compacts forming dielectric ceramic layers were measured. The results are shown in Table 6.

uct showed a high value of 4,500 Ω·F or more, and the heat generation (increase in temperature) was a small, such as 20° C. or less.

However, in samples 201 and 202, since the content d of D was more than about 0.02 mole, the defect rate in the AC loading test was increased and the average life time in the high temperature loading test was extremely decreased. In

TABLE 6

| Sample No. | Firing Temperature (° C.) | c/a | | Phase Transition Temperature (° C.) | Relative Dielectric Constant | Heat Generation (° C.) | CR Product (Ω · F) | AC Loading Test Defect Rate (%) | High Temperature Loading Test (Hour) |
|---|---|---|---|---|---|---|---|---|---|
| | | −25° C. | +25° C. | | | | | | |
| 201 | 1250 | 1.000 | 1.000 | −40 | 1420 | 15 | 6800 | 70 | 100 |
| 202 | 1250 | 1.000 | 1.000 | −40 | 1460 | 15 | 6800 | 80 | 70 |
| 203 | 1250 | 1.001 | 1.000 | −35 | 1550 | 16 | 7200 | 0 | 1100 |
| 204 | 1250 | 1.002 | 1.000 | −25 | 1680 | 18 | 8100 | 0 | 1130 |
| 205 | 1200 | 1.001 | 1.000 | −35 | 1600 | 17 | 7500 | 0 | 1160 |
| 206 | 1250 | 1.000 | 1.000 | −40 | 1440 | 15 | 6900 | 0 | 1100 |
| 207 | 1250 | 1.000 | 1.000 | −45 | 1070 | 13 | 4800 | 0 | 1140 |

In Tables 5 and 6, samples 201 and 202 were samples in which the content d of D was more than about 0.02 mole.

According to samples 201 to 207, as shown in Table 5, when the barium titanate-based solid solution was represented by the formula $\{(Ba_{1-x-y}Sr_xCa_y)O\}_m TiO_2 + aR + bM + dD$, x+y was in the range of from zero to about 0.20, a was in the range of from 0.005 to 0.12, b was in the range of from about 0.005 to 0.12, m satisfied $1.000 < m \leq 1.035$, and in addition, the auxiliary sintering agent was contained in the range of from about 0.2 to 4.0 parts by weight.

For samples 201 to 207, as shown in Table 6, sintering could be performed at 1,300° C. or less, and hence, a base samples 203 to 207, since the content d of D was less than about 0.02 mole, the defect rate in the AC loading test could be suppressed to be 0%, and in the high temperature loading test, an average life time of 1,100 hours or more could be ensured.

EXAMPLE 4

In this example, reduction-resistant dielectric ceramic compacts having a composition represented by the formula $\{(Ba_{1-x-y}Sr_xCa_y)O\}_m TiO_2 + aR + bM + cX(Zr,Hf)O_3 + dD$ are to be obtained.

First, as starting materials, powdered $BaCO_3$, $CaCO_3$, $SrCO_3$ and $TiO_2$ were prepared each having a purity of 98%, and $\{(Ba_{1-x-y}Sr_xCa_y)O\}_mTiO_2$, a type of barium titanate-based solid solution represented by $ABO_3$ showing a perovskite structure, was formed in a manner equivalent to that in the first example so as to have a composition in which the molar ratios of x, y, and m were in accordance with those shown in Table 7.

As a starting material for R, powdered $La_2O_3$, $Pr_6O_{11}$, $Eu_2O_3$, $Gd_2O_3$, $Tb_4O_7$, $Dy_2O_3$, $Ho_2O_3$, $Tm_2O_3$ and $Lu_2O_3$ were prepared each having a purity of 99% or more.

As a starting material for M, powdered MnO, NiO, MgO, $Fe_2O_3$, $Al_2O_3$ and $Cr_2O_3$ were prepared each having a purity of 99% or more.

As a starting material for $X(Zr,Hf)O_3$, powdered $BaZrO_3$, $SrZrO_3$ and $CaZrO_3$ were prepared.

In addition, as a starting material for D, powdered $V_2O_5$, $Nb_2O_5$, $Ta_2O_5$, $MoO_3$, $WO_3$, $Y_2O_3$, $Sc_2O_3$, $P_2O_5$, $Al_2O_3$ and $Fe_2O_3$ were prepared.

In a manner equivalent to that in the first example, the auxiliary sintering agents ①, ②, ③, and ④ were prepared.

Next, the barium titanate-based solid solutions thus prepared and the starting materials for the other components were weighed so as to obtain the compositions shown in Table 7.

In Table 7, the factor a of R, the factor b of M, the factor c of $X(Zr,Hf)O_3$ and the factor d of D are shown in a manner equivalent to those in Tables 1, 3, and 5 and by the same units as those therein. In addition, the content of the auxiliary sintering agent is represented by the parts by weight with respect to 100 parts by weight of the primary component $\{(Ba_{1-x-y}Sr_xCa_y)O\}_mTiO_2+aR+bM+cX(Zr,Hf)O_3+dD$.

TABLE 7

| Sample No. | x | y | x + y | a(Molar Ratio) R(Oxide of Element) | | | | Total of a | b(Molar Ratio) M(Oxide of Element) | | | | Total of b | m |
|---|---|---|---|---|---|---|---|---|---|---|---|---|---|---|
| 301 | 0 | 0.1 | 0.1 | Gd | 0.05 | Tm | 0.03 | 0.08 | Mg | 0.07 | Mn | 0.02 | 0.09 | 1.005 |
| 302 | 0.03 | 0.02 | 0.05 | Gd | 0.09 | | | 0.09 | Mg | 0.07 | Cr | 0.02 | 0.09 | 1.005 |
| 303 | 0.05 | 0.05 | 0.1 | Gd | 0.03 | Pr | 0.01 La 0.01 | 0.05 | Ni | 0.03 | Fe | 0.03 | 0.06 | 1.010 |
| 304 | 0.1 | 0.1 | 0.2 | Gd | 0.09 | Ho | 0.01 | 0.1 | Mg | 0.05 | Ni | 0.05 | 0.1 | 1.005 |
| 305 | 0.05 | 0.05 | 0.1 | Tb | 0.09 | | | 0.09 | Mg | 0.05 | Mn | 0.05 | 0.1 | 1.010 |
| 306 | 0 | 0.1 | 0.1 | Eu | 0.07 | La | 0.04 | 0.11 | Al | 0.08 | Mg | 0.02 | 0.1 | 1.010 |
| 307 | 0.05 | 0 | 0.05 | Eu | 0.06 | | | 0.06 | Mg | 0.05 | Mn | 0.01 Cr 0.01 | 0.07 | 1.015 |
| 308 | 0 | 0.05 | 0.05 | Dy | 0.04 | Lu | 0.01 | 0.05 | Mg | 0.04 | Ni | 0.01 | 0.05 | 1.015 |

| Sample No. | c(Molar Ratio) | | | Total of c | d(Molar Ratio) Element D | | | | Total of d | Auxiliary Sintering Agent (Parts by Weight) | | | |
|---|---|---|---|---|---|---|---|---|---|---|---|---|---|
| | Ca | Sr | Ba | | | | | | | ① | ② | ③ | ④ |
| 301 | 0 | 0.05 | 0.20 | 0.25 | Nb | 0.01 | | | 0.010 | 0 | 2 | 0 | 0 |
| 302 | 0 | 0 | 0.10 | 0.10 | Y | 0.02 | Mo | 0.01 | 0.030 | 0 | 0 | 2.5 | 0 |
| 303 | 0.10 | 0 | 0.14 | 0.24 | W | 0.03 | | | 0.030 | 1.6 | 0 | 0 | 0 |
| 304 | 0 | 0 | 0.05 | 0.05 | Al | 0.008 | | | 0.008 | 0 | 0 | 0 | 2.3 |
| 305 | 0 | 0 | 0.12 | 0.12 | V | 0.015 | | | 0.015 | 0 | 0 | 2.8 | 0 |
| 306 | 0.05 | 0 | 0.10 | 0.15 | Fe | 0.015 | | | 0.015 | 0 | 3 | 0 | 0 |
| 307 | 0 | 0.04 | 0.04 | 0.08 | P | 0.005 | Ta | 0.005 | 0.010 | 2 | 0 | 0 | 0 |
| 308 | 0.05 | 0 | 0.05 | 0.10 | Sc | 0.005 | | | 0.005 | 0 | 0 | 2.5 | 0 |

Subsequently, in a manner equivalent to than in the first example, laminated ceramic capacitors to be used as samples were formed and the characteristics of the laminated ceramic capacitors and the dielectric ceramic compacts forming dielectric ceramic layers were measured. The results are shown in Table 8.

TABLE 8

| Sample No. | Firing Temperature (° C.) | c/a | | Phase Transition Temperature (° C.) | Relative Dielectric Constant | Heat Generation (° C.) | CR Product (W × F) | AC Loading Test Defect Rate (%) | High Temperature Loading Test (Hour) |
|---|---|---|---|---|---|---|---|---|---|
| | | −25° C. | +25° C. | | | | | | |
| 301 | 1250 | 1.000 | 1.000 | <−60 | 260 | 5 | 20200 | 0 | 1180 |
| 302 | 1250 | 1.000 | 1.000 | <−60 | 1060 | 10 | 11300 | 70 | 90 |
| 303 | 1300 | 1.000 | 1.000 | <−60 | 280 | 5 | 20100 | 80 | 100 |
| 304 | 1200 | 1.000 | 1.000 | <−60 | 1450 | 15 | 7500 | 0 | 1170 |
| 305 | 1200 | 1.000 | 1.000 | <−60 | 1230 | 12 | 10900 | 0 | 1190 |
| 306 | 1200 | 1.000 | 1.000 | <−60 | 1080 | 10 | 13200 | 0 | 1210 |
| 307 | 1250 | 1.000 | 1.000 | <−60 | 1300 | 12 | 10800 | 0 | 1170 |
| 308 | 1200 | 1.000 | 1.000 | <−60 | 1270 | 12 | 12600 | 0 | 1150 |

In Tables 7 and 8, samples 301 to 303 were samples in which the content c of $X(Zr,Hf)O_3$ was more than about 0.20 mole and/or the content d of D was more than about 0.02 mole.

According to samples 301 to 308, as shown in Table 7, when the barium titanate-based solid solution was represented by the formula $\{(Ba_{1-x-y}Sr_xCa_y)O\}_mTiO_2+aR+bM+cX(Zr,Hf)O_3+dD$, x+y was in the range of from zero to about 0.20, a was in the range of from about 0.005 to 0.12, b was in the range of from about 0.005 to 0.12, m satisfied $1.000<m\leq1.035$, and in addition, the auxiliary sintering agent was contained in the range of from about 0.2 to 4.0 parts by weight.

For samples 301 to 308, as shown in Table 8, sintering could be performed at 1,300° C. or less, and hence, a base metal such as nickel could be used as the internal electrode material. In addition, the crystalline axis ratio c/a obtained by x-ray diffraction in a temperature range of −25° C. or above satisfied $1.000\leq c/a\leq1.003$, and the phase transition temperature was below −25° C. Furthermore, the CR product showed a high value of 7,500 Ω·F or more, and the heat generation (increase in temperature) was a small, such as 20° C. or less.

However, according to sample 301, where the content c was more than about 0.20 mole, the relative dielectric constant was less than 300. In addition, according to sample 302, the content d was more than 0.02 mole, the defect rate by the AC loading test was increased and the average life time by the high temperature loading test was extremely decreased.

In the sample 303, since the content c of $X(Zr,Hf)O_3$ was more than about 0.20 and the content d of D was more than about 0.02, the relative dielectric constant was low, such as less than 300; the defect rate in the AC loading test was increased; and in the high temperature loading test, the average life time was extremely decreased.

According to samples 304 to 308, since the content c of $X(Zr,Hf)O_3$ was about 0.20 or less and the content d of D was about 0.02 or less, the relative dielectric constant was more than 1,000, the defect rate in the AC loading test could be suppressed to be 0%, and in the high temperature loading test, the average life time was increased to 1,150 hours or more.

EXAMPLE 5

In this example, reduction-resistant dielectric ceramic compacts are to be obtained having a composition represented by the formula $\{(Ba_{1-x-y}Sr_xCa_y)O\}_mTiO_2+aR+bM+cX(Zr,Hf)O_3+dD$ using a solid solution, $(Ba_{1-x-y}Sr_xCa_y)O\}_mTiO_2$, containing various impurities at various concentrations.

First, as starting materials, powdered $BaCO_3$, $CaCO_3$, $SrCO_3$ and $TiO_2$ were prepared each having various impurities, and $\{(Ba_{1-x-y}Sr_xCa_y)O\}_mTiO_2$, a type of barium titanate-based solid solution represented by $ABO_3$ showing a perovskite structure, was formed in a manner equivalent to that in the first example so as to have a composition in which the molar ratios of x, y, and m were in accordance with those shown in Table 9. With respect to 100 parts by weight of the barium titanate-based solid solution $\{(Ba_{1-x-y}Sr_xCa_y)O\}_mTiO_2$, compounds containing Na, S and K, and Cl were contained at contents in parts by weight as shown in Table 9. In this connection, in Table 9, the parts by weight of Na, S and K are values when they are in the form of $Na_2O$, $SO_3$, and $K_2O$, respectively.

TABLE 9

| Type of Barium Titanate-Based Solid Solution | x | y | x + y | m | Parts by Weight of Impurity (Na, S, K and Cl) to 100 Parts by Weight of (BaSrCa)TiO₃ | | | |
|---|---|---|---|---|---|---|---|---|
| | | | | | Na | S | K | Cl |
| A | 0 | 0.08 | 0.08 | 1.010 | 0.1 | 0.8 | 0.1 | 0.1 |
| B | 0.02 | 0.03 | 0.05 | 1.005 | 0.8 | 0.1 | 0.6 | 0.1 |
| C | 0.05 | 0.04 | 0.09 | 1.010 | 0.1 | 0.1 | 0.1 | 8 |
| D | 0.1 | 0.1 | 0.2 | 1.005 | 0.2 | 0.5 | 0.2 | 2 |
| E | 0.04 | 0.05 | 0.09 | 1.005 | 0.3 | 0.1 | 0.1 | 5 |
| F | 0 | 0.11 | 0.11 | 1.010 | 0.5 | 0.3 | 0.5 | 1 |

As a starting material for R, powdered $La_2O_3$, $CeO_2$, $Pr_6O_{11}$, $Eu_2O_3$, $Gd_2O_3$, $Tb_4O_7$, $Ho_2O_3$ and $Tm_2O_3$ were prepared each having a purity of 99% or more.

As a starting material for M, powdered MnO, NiO, MgO, $Fe_2O_3$, $Al_2O_3$ and $Cr_2O_3$ were prepared each having a purity of 99% or more.

As a starting material for $X(Zr,Hf)O_3$, powdered $BaZrO_3$, $SrZrO_3$ and $CaZrO_3$ were prepared.

In addition, as a starting material for D, powdered $V_2O_5$, $Nb_2O_5$, $Ta_2O_5$, $MoO_3$, $WO_3$, $Y_2O_3$, $P_2O_5$, $Al_2O_3$ and $Fe_2O_3$ were prepared.

In a manner equivalent to that in the first example, the auxiliary sintering agents ①, ②, ③, and ④ were prepared.

Next, the barium titanate-based solid solutions thus prepared and the starting materials for the other components were weighed so as to obtain the compositions shown in Table 10.

In Table 10, the factor a of R, the factor b of M, the factor c of $X(Zr,Hf)O_3$ and the factor d of D are shown in a manner equivalent to those in Tables 1, 3, and 5 and by the same units as those therein. In addition, the content of the auxiliary sintering agent is represented in parts by weight with respect to 100 parts by weight of the primary component $\{(Ba_{1-x-y}Sr_xCa_y)O\}_mTiO_2+aR+bM+cX(Zr,Hf)O_3+dD$.

TABLE 10

| Sample No. | Type of Solid solution | a(Molar Ratio) R (Oxide of Element) | | | | Total of a | b(Molar Ratio) M (Oxide of Element) | | | Total of b | c(Molar Ratio) | | | Total of c |
|---|---|---|---|---|---|---|---|---|---|---|---|---|---|---|
| | | | | | | | | | | | Ca | Sr | Ba | |
| 401 | A | Eu | 0.05 | Tm | 0.04 | 0.09 | Mg | 0.07 | Mn 0.02 | 0.09 | 0 | 0.05 | 0.15 | 0.20 |
| 402 | B | Gd | 0.08 | | | 0.08 | Mn | 0.07 | Cr 0.02 | 0.09 | 0.10 | 0 | 0 | 0.10 |
| 403 | C | Eu | 0.03 | Ho | 0.02 Ce 0.01 | 0.06 | Ni | 0.03 | Fe 0.03 | 0.06 | 0.10 | 0 | 0.10 | 0.20 |
| 404 | D | Gd | 0.09 | Pr | 0.01 | 0.10 | Mg | 0.05 | Ni 0.05 | 0.1 | 0 | 0 | 0.05 | 0.05 |
| 405 | E | Eu | 0.08 | | | 0.08 | Mg | 0.05 | Mn 0.05 | 0.1 | 0 | 0 | 0.15 | 0.15 |

TABLE 10-continued

| 406 | F | Tb | 0.07 | La | 0.04 | | 0.11 | Al | 0.08 | Mn | 0.02 | | | 0.1 | 0.02 | 0 | 0.10 | 0.12 |
|---|---|---|---|---|---|---|---|---|---|---|---|---|---|---|---|---|---|---|
| 407 | E | Gd | 0.07 | | | | 0.07 | Mg | 0.05 | Mn | 0.01 | Cr | 0.01 | 0.07 | 0 | 0.04 | 0.06 | 0.10 |

| Sample No. | d(Molar Ratio) | | | | Total of d | Sintering Auxiliary Agent (Parts by Weight) | | | |
|---|---|---|---|---|---|---|---|---|---|
| | Element D | | | | | ① | ② | ③ | ④ |
| 401 | Nb | 0.01 | | | 0.010 | 0 | 2.1 | 0 | 0 |
| 402 | Y | 0.01 | Mo | 0.01 | 0.020 | 0 | 0 | 2.7 | 0 |
| 403 | W | 0.02 | | | 0.020 | 1.8 | 0 | 0 | 0 |
| 404 | Al | 0.008 | | | 0.008 | 0 | 0 | 0 | 2.1 |
| 405 | V | 0.015 | | | 0.015 | 0 | 0 | 2.8 | 0 |
| 406 | Fe | 0.015 | | | 0.015 | 0 | 2.7 | 0 | 0 |
| 407 | P | 0.005 | Ta | 0.005 | 0.010 | 2.1 | 0 | 0 | 0 |

Subsequently, in a manner equivalent to than in the first example, laminated ceramic capacitors to be used as samples were formed. In addition, in a manner equivalent to that in the first example, characteristics of the laminated ceramic capacitors and the dielectric ceramic compacts forming dielectric ceramic layers were measured. The results are shown in Table 11.

TABLE 11

| Sample No. | Firing Temperature (° C.) | c/a | | Phase Transition Temperature (° C.) | Relative Dielectric Constant | Heat Generation (° C.) | CR Product (Ω · F) | AC Loading Test Defect Rate (%) | High Temperature Loading Test (Hour) |
|---|---|---|---|---|---|---|---|---|---|
| | | −25° C. | +25° C. | | | | | | |
| 401 | 1250 | 1.000 | 1.000 | Not Measurable due to Considerable Breakage of Internal Electrode | | | | | |
| 402 | 1250 | 1.000 | 1.000 | < −60 | 560 | 5 | 3200 | 0 | 80 |
| 403 | 1300 | 1.000 | 1.000 | < −60 | 780 | 5 | 4980 | 0 | 50 |
| 404 | 1200 | 1.000 | 1.000 | < −60 | 1420 | 14 | 7020 | 0 | 1120 |
| 405 | 1200 | 1.000 | 1.000 | < −60 | 1070 | 11 | 10500 | 0 | 1070 |
| 406 | 1200 | 1.000 | 1.000 | < −60 | 1120 | 9 | 13000 | 0 | 1220 |
| 407 | 1200 | 1.000 | 1.000 | < −60 | 1310 | 11 | 11100 | 0 | 1240 |

In Tables 10 and 11, samples 401 and 402 were samples which were prepared by using barium titanates-based solid solution "A" and "B" shown in Table 9, respectively, in which at least one compound containing at least one element selected from the group consisting of S, Na and K in the form of $SO_3$, $Na_2O$, and $K_2O$ was contained at a content of more than about 0.5 part by weight with respect to 100 parts by weight of a barium titanate-based solid solution $\{(Ba_{1-x-y}Sr_xCa_y)O\}_m TiO_2$, and sample 403 was prepared by using barium titanate-based solid solution "C" shown in Table 9 in which about 5 parts by weight or more of Cl was contained.

According to samples 401 to 407, as shown in Tables 9 and 10, when the barium titanate-based solid solution was represented by the formula $\{(Ba_{1-x-y}Sr_xCa_y)O\}_m TiO_2 + aR + bM + cX(Zr,Hf)O_3 + dD$, x+y was in the range of from zero to about 0.20, a was in the range of from about 0.005 to 0.12, b was in the range of from about 0.005 to 0.12, c was about 0.20 or less, d was about 0.02 or less, m satisfied $1.000 < m \leq 1.035$, and in addition, the auxiliary sintering agent was contained in the range of from 0.2 to 4.0 parts by weight.

According to samples 401 to 407, as shown in Table 11, sintering could be performed at 1,300° C. or less, and hence, a base metal such as nickel could be used as the internal electrode material. In addition, the crystalline axis ratio c/a obtained by x-ray diffraction in a temperature range of −25° C. or above satisfied $1.000 \leq c/a \leq 1.003$.

However, according to sample 401, since the content of S in the form of $SO_3$ was more than about 0.5 part by weight, the continuity of the internal electrode was degraded, and hence, the evaluation could not be performed. As seen in the case of sample 402, when the contents of Na and K were more than 0.5 part by weight in the form of $Na_2O$ and $K_2O$, respectively, the relative dielectric constant was decreased, and in addition, the average life time in the high temperature loading test was extremely decreased. In the case of sample 403, when the content of Cl was more than about 5 parts by weight, the relative dielectric constant was decreased, and the average life time in the high temperature loading test was extremely decreased.

With samples 404 to 407, since the content of Na, S and K was less than about 0.5 part by weight in the form of $Na_2O$, $SO_3$ and $K_2O$, respectively, and the content of Cl was less than about 5 parts by weight, the relative dielectric constant was more than 1,000, and the average life time in the high temperature loading test was more than 1,000 hours. In addition, the phase transition temperature was below −25° C.; the CR product was high, such as more than 7,000 Ω·F; the heat generation (increase in temperature) was small, such as 14° C. or less; the defect rate by the AC loading test could be suppressed to be 0%; and by the high temperature loading test, the average life time was increased to be more than 1,000 hours.

In the first to the fifth examples described above, barium titanate-based powder prepared by a solid phase method was used; however, the present invention is not limited thereto, and for example, barium titanate-based material prepared by a wet method, such as an oxalic acid method, an alkoxide method or a hydrothermal synthetic method, may also be used. By using powder prepared by the latter method, characteristics improved than those obtained in the first to the fifth examples may be obtained in some cases.

In addition, as starting materials for other than the barium titanate-based solid solution, various powdered oxides were used; however the present invention is not limited to those oxides, and instead of those described above, materials in the form of an alkoxide or an organic metal compound may also be used.

Furthermore, in the examples described above, the phase transition temperature of a crystal forming a major portion of the dielectric ceramic compact was discussed, and even though the secondary phase is present, the practical characteristics will not be influenced.

As has thus been described, according to the reduction-resistant dielectric ceramic compact of the present invention, since firing at 1,300° C. or less in a non-oxidizing atmosphere can be performed, a base metal such as nickel, a nickel alloy, copper, or a copper alloy can be used as the internal electrode material in the laminated ceramic capacitor formed of this dielectric ceramic compact.

According to the reduction-resistant dielectric ceramic compact of the present invention, in addition to a sufficient relative dielectric constant of 700 or more, the loss and the heat generation are low under high frequency conditions of high voltage or large current, and superior resistant characteristics under AC or DC high temperature loading conditions, that is, a stable insulating resistance, can be obtained. Consequently, when a laminated ceramic capacitor is formed of this dielectric ceramic compact, the reliability of the laminated ceramic capacitor can be improved.

What is claimed is:

1. A reduction-resistant dielectric ceramic compact comprising:
    a solid solution comprising barium titanate as a primary component and an auxiliary sintering agent which has an x-ray diffraction crystalline axis ratio c/a in a temperature range of −25° C. or above of $1.000 \leq c/a \leq 1.003$ and a maximum peak for temperature dependence of a dielectric constant measured at an electric strength of 2 Vrms/mm or less and at an AC frequency of 1 kHz at a temperature of below −25° C.,
    wherein the primary component is represented by the formula $ABO_3 + aR + bM$, in which $ABO_3$ is a barium titanate-based perovskite compound having A-site and B-site elements such that $1.000 < A/B \leq 1.035$,
    R is a compound containing at least one element selected from the group consisting of La, Ce, Pr, Nd, Sm, Eu, Gd, Tb, Dy, Ho, Er, Tm, Yb and Lu,
    M is a compound containing at least one element selected from the group consisting of Mn, Ni, Mg, Fe, Al, Cr and Zn,
    and a and b are in moles such that $0.005 \leq a \leq 0.12$, and $0.005 \leq b \leq 0.12$.

2. A reduction-resistant dielectric ceramic compact according to claim 1, wherein the auxiliary sintering agent is about 0.2 to 4 parts by weight with respect to 100 parts by weight of the primary component.

3. A reduction-resistant dielectric ceramic compact according to claim 1, wherein the primary component comprises $X(Zr,Hf)O_3$ in which X is at least one element selected from the group consisting of Ba, Sr and Ca.

4. A reduction-resistant dielectric ceramic compact according to claim 3, wherein the amount of $X(Zr,Hf)O_3$ is greater than zero up to about 0.20 mole with respect to 1 mole of the $ABO_3$ in the primary component.

5. A reduction-resistant dielectric ceramic compact according to claim 1, wherein the primary component further comprises a compound D containing at least one element selected from the group consisting of V, Nb, Ta, Mo, W, Y, Sc, P, Al and Fe.

6. A reduction-resistant dielectric ceramic compact according to claim 5, wherein the amount of D is more than zero up to about 0.02 mole with respect to 1 mole of the $ABO_3$ in the primary component.

7. A reduction-resistant dielectric ceramic compact according to claim 5, wherein the primary component comprises $X(Zr,Hf)O_3$ in which X is at least one element selected from the group consisting of Ba, Sr and Ca.

8. A reduction-resistant dielectric ceramic compact according to claim 3, wherein the amount of $X(Zr,Hf)O_3$ and the amount of D are each greater than zero up to about 0.20 mole with respect to 1 mole of the $ABO_3$ in the primary component.

9. A reduction-resistant dielectric ceramic compact according to claim 8, wherein
    $ABO_3$ is a barium titanate-based perovskite compound represented by the formula $\{(Ba_{1-x-y}Sr_xCa_y)O\}_mTiO_2$ in which $0 \leq x+y \leq 0.20$ and $1.000 < m \leq 1.035$, and the auxiliary sintering agent is selected from the group consisting of a compound containing boron, a compound containing silicon and a compound containing boron and silicon, and
    which further comprises, with respect to 100 parts by weight of the barium titanate-based perovskite compound, a positive amount up to about 0.5 part of a compound containing at least one element selected from the group consisting of S, Na and K, and a positive amount up to about 5 parts of a compound containing Cl.

10. A reduction-resistant dielectric ceramic compact according to claim 1, wherein
    $ABO_3$ is a barium titanate-based perovskite compound represented by the formula $\{(Ba_{1-x-y}Sr_xCa_y)O\}_mTiO_2$ in which $0 \leq x+y \leq 0.20$ and $1.000 < m \leq 1.035$, and
    further comprises, with respect to 100 parts by weight of the barium titanate-based perovskite compound, a positive amount up to about 0.5 part of a compound containing at least one element selected from the group consisting of S, Na and K, and a positive amount up to about 5 parts of a compound containing Cl.

11. A reduction-resistant dielectric ceramic compact according to claim 1, wherein the auxiliary sintering agent is selected from the group consisting of a compound containing boron, a compound containing silicon and a compound containing boron and silicon.

12. A reduction-resistant dielectric ceramic compact according to claim 11, wherein the compound containing silicon is silicon oxide.

13. A laminated ceramic capacitor comprising:
    a plurality of dielectric ceramic layers;
    a plurality of internal electrodes each of which sandwiches at least a part of a dielectric ceramic layer; and
    a pair of external electrodes electrically connected to the internal electrodes,
    wherein the dielectric ceramic layers comprise a reduction-resistant dielectric ceramic compact according to claim 9.

14. A laminated ceramic capacitor according to claim 13, wherein the internal electrodes comprise nickel, a nickel alloy, copper or a copper alloy.

15. A laminated ceramic capacitor according to claim 14, wherein each external electrodes comprises a first sintered layer comprising a powdered conductive metal and optionally glass frit, crystallized glass or ceramic; and a second layer disposed on the first layer and which is a plating layer.

16. A laminated ceramic capacitor comprising:

a plurality of dielectric ceramic layers;

a plurality of internal electrodes each of which sandwiches at least a part of a dielectric ceramic layer; and a pair of external electrodes electrically connected to the internal electrodes, wherein the dielectric ceramic layers comprise a reduction-resistant dielectric ceramic compact according to claim 7.

17. A laminated ceramic capacitor according to claim 16, wherein the internal electrodes comprise nickel, a nickel alloy, copper or a copper alloy.

18. A laminated ceramic capacitor according to claim 17, wherein each external electrodes comprises a first sintered layer comprising a powdered conductive metal and optionally glass frit, crystallized glass or ceramic; and a second layer disposed on the first layer and which is a plating layer.

19. A laminated ceramic capacitor comprising:

a plurality of dielectric ceramic layers;

a plurality of internal electrodes each of which sandwiches at least a part of a dielectric ceramic layer; and a pair of external electrodes electrically connected to the internal electrodes, wherein the dielectric ceramic layers comprise a reduction-resistant dielectric ceramic compact according to claim 1.

20. A laminated ceramic capacitor according to claim 19, wherein the internal electrodes comprise nickel, a nickel alloy, copper or a copper alloy.

21. A laminated ceramic capacitor according to claim 19, wherein each external electrodes comprises a first sintered layer comprising a powdered conductive metal and optionally glass frit, crystallized glass or ceramic; and a second layer disposed on the first layer and which is a plating layer.

* * * * *